US012507292B2

(12) United States Patent
Van Phan et al.

(10) Patent No.: US 12,507,292 B2
(45) Date of Patent: Dec. 23, 2025

(54) TERMINAL NODE TO TERMINAL NODE COMMUNICATION

(71) Applicant: Nokia Technologies Oy, Espoo (FI)

(72) Inventors: Vinh Van Phan, Oulu (FI); Ling Yu, Kauniainen (FI); Lianghai Ji, Aalborg (DK); Faranaz Sabouri-Sichani, Aalborg (DK); Rudraksh Shrivastava, Erligheim (DE); Sudeep Hegde, Stuttgart (DE)

(73) Assignee: Nokia Technologies Oy, Espoo (FI)

( * ) Notice: Subject to any disclaimer, the term of this patent is extended or adjusted under 35 U.S.C. 154(b) by 398 days.

(21) Appl. No.: 18/006,996

(22) PCT Filed: Jul. 23, 2021

(86) PCT No.: PCT/EP2021/070623
§ 371 (c)(1),
(2) Date: Jan. 26, 2023

(87) PCT Pub. No.: WO2022/028919
PCT Pub. Date: Feb. 10, 2022

(65) Prior Publication Data
US 2023/0269800 A1 Aug. 24, 2023

(30) Foreign Application Priority Data
Aug. 5, 2020 (EP) .................................... 20189505

(51) Int. Cl.
*H04W 76/14* (2018.01)
*H04L 1/1812* (2023.01)
*H04W 88/04* (2009.01)

(52) U.S. Cl.
CPC ........... *H04W 76/14* (2018.02); *H04L 1/1812* (2013.01); *H04W 88/04* (2013.01)

(58) Field of Classification Search
CPC ..... H04W 76/14; H04W 88/04; H04W 76/23; H04L 1/1812
See application file for complete search history.

(56) References Cited

U.S. PATENT DOCUMENTS

| 2017/0034688 A1 | 2/2017 | Kim et al. |
| 2017/0215183 A1 | 7/2017 | Gulati et al. |

(Continued)

FOREIGN PATENT DOCUMENTS

| CN | 111147188 A | 5/2020 |
| WO | 2017/008044 A1 | 1/2017 |

(Continued)

OTHER PUBLICATIONS

Office action received for corresponding European Patent Application No. 20189505.9, dated Mar. 14, 2024, 6 pages.

(Continued)

*Primary Examiner* — Jae Y Lee
*Assistant Examiner* — Nick Anon Sundara
(74) *Attorney, Agent, or Firm* — Barta Jones, PLLC

(57) ABSTRACT

A system and method for establishing a unicast sidelink communication channel between a source user equipment (UE) and a target UE via a relay UE is described. The source UE sends a relay request message to a potential relay UE. The message includes information to configure a sidelink Hybrid Automatic Repeat Request (HARQ) process with feedback enabled. The information also indicates no transport block for HARQ transmissions to the target UE and enables the relay UE to send a sidelink unicast message to the target UE using the source UE's identifier. The relay UE sends a sidelink message without a transport block to the target UE using the configured common HARQ process and resources and subsequently sends a response message to the source UE indicating an outcome of the HARQ process.

3 Claims, 5 Drawing Sheets

(56) References Cited

U.S. PATENT DOCUMENTS

2020/0052774 A1   2/2020   Basu Mallick et al.
2021/0084558 A1*  3/2021   Speicher ............... H04W 36/22
2021/0099901 A1*  4/2021   Huang .................. H04W 72/12

FOREIGN PATENT DOCUMENTS

WO    2018/095550 A1    5/2018
WO    2020/065057 A1    4/2020

OTHER PUBLICATIONS

"Revised SID: Study on System enhancement for Proximity based Services in 5GS", 3GPP TSG SA Meeting #84, SP-190443, Agenda Item: 6.4, SA WG2, Jun. 5-7, 2019, 4 pages.

"New SID: Study on NR sidelink relay", 3GPP TSG RAN Meeting #86, RP-193253, Agenda Item: 9.1.2, OPPO, Dec. 9-12, 2019, pp. 1-5.

"3rd Generation Partnership Project; Technical Specification Group Radio Access Network; NR; NR and NG-RAN Overall Description; Stage 2 (Release 16)", 3GPP TS 38.300, V16.1.0, Mar. 2020, pp. 1-133.

Kataoka et al., "Sidelink Grouping Method for Multicasting D2D Signaling Messages with Considerations of Sidelink Transmission Power", IEEE 4th International Conference on Computer and Communication Systems (ICCCS), Feb. 23-25, 2019, pp. 507-511.

Aygun et al., "Side-Link Assisted Hybrid Automatic Repeat Request for Ultra-Reliable Low Latency Communications", 21th International ITG Workshop on Smart Antennas, Mar. 15-17, 2017, pp. 109-115.

Gandotra et al., "Device-to-Device Communication in Cellular Networks: A Survey", arXiv, 2016, pp. 1-22.

"3rd Generation Partnership Project; Technical Specification Group Radio Access Network; NR; Multiplexing and channel coding (Release 16)", 3GPP TS 38.212, V16.2.0, Jun. 2020, pp. 1-151.

Extended European Search Report received for corresponding European Patent Application No. 20189505.9, dated Feb. 1, 2021, 13 pages.

"Discussion on Relay Associated Selection and Relay-Assisted eNB Resource Allocation for Sidelink UE to-NW relaying", 3GPP TSG RAN WG1 Meeting #90, R1-1714197, Agenda Item: 5.2.9.2.3.2, ITRI, Aug. 21-25, 2017, 5 pages.

"Initial relay discovery and relay reselection", 3GPP TSG-RAN WG2 Meeting #98, R2-1704330, Agenda Item: 9.1.3.2, Nokia, May 15-19, 2017, 4 pages.

International Search Report and Written Opinion received for corresponding Patent Cooperation Treaty Application No. PCT/EP2021/070623, dated Oct. 28, 2021, 18 pages.

Office action received for corresponding Chinese Patent Application No. 202180064386.0, dated May 21, 2025, 6 pages of office action and no page of translation available.

* cited by examiner

TERMINAL NODE TO TERMINAL NODE COMMUNICATION

RELATED APPLICATION

This application was originally filed as PCT Application No. PCT/EP2021/070623, filed on Jul. 23, 2021, which claims priority from EP Application Serial No. 20189505.9, filed on Aug. 5, 2020, each of which is incorporated herein by reference in its entirety.

TECHNOLOGICAL FIELD

Embodiments of the present disclosure relate to terminal node to terminal node communication. Some relate to terminal node to terminal node communication via a relay that is not a cell base station.

BACKGROUND

A radio telecommunications network typically comprises terminal nodes and access nodes such as base stations. The terminal nodes communicate directly with the access nodes. The terminal nodes communicate indirectly with each other via one or more access nodes.

In some circumstances it may be desirable for terminal nodes to communicate with each other without using an intermediate access node.

In 3GPP, a terminal node (user equipment) is able to communicate directly with another terminal node (user equipment), without using an access node (cell base station) using sidelink communication channels.

BRIEF SUMMARY

According to various, but not necessarily all, embodiments there is provided a mobile equipment comprising means for:

determining to attempt to create a unicast sidelink communication channel between the mobile equipment and an identified target user equipment via a relay user equipment; and sending a relay request message to at least one user equipment, operable as a relay to the target user equipment, wherein the relay request message comprises at least some information for configuring a sidelink process to obtain feedback from the target user equipment.

In some but not necessarily all examples, the sidelink process with feedback is a hybrid automatic repeat request (HARQ) process with feedback enabled.

In some but not necessarily all examples, the mobile equipment comprises: means for: receiving a relay response message indicative of a HARQ NACK communication to the relay user equipment from the target user equipment in reply to a sidelink message sent from the relay user equipment to the target user equipment by using the sidelink HARQ process with feedback enabled.

In some but not necessarily all examples, the relay request message is broadcast or groupcast.

In some but not necessarily all examples, the information, comprised in the relay request message, explicitly or implicitly specifies the sidelink HARQ process with feedback enabled.

In some but not necessarily all examples, the information, comprised in the relay request message, explicitly specifies no transport block for the sidelink HARQ process with feedback enabled.

In some but not necessarily all examples, the information, comprised in the relay request message, explicitly or implicitly enables a relay user equipment to send a sidelink unicast message with a source identifier being an identifier of the mobile equipment and a destination identifier being an identifier of the target user equipment using the sidelink HARQ process with feedback enabled.

According to various, but not necessarily all, embodiments there is provided a method comprising:

determining to attempt to create a unicast sidelink communication channel between a user equipment and an identified target user equipment via a relay user equipment; and sending a relay request message to at least one mobile equipment, operable as a relay to the target user equipment, wherein the relay request message comprises at least some information for configuring a sidelink process to obtain feedback from the target user equipment.

According to various, but not necessarily all, embodiments there is provided a computer program that when loaded into a processor of a user equipment causes:

determining to attempt to create a unicast sidelink communication channel between the user equipment and an identified target user equipment via a relay user equipment; and sending a relay request message to at least one mobile equipment, operable as a relay to the target user equipment, wherein the relay request message comprises at least some information for configuring a sidelink process to obtain feedback from the target user equipment.

According to various, but not necessarily all, embodiments there is provided a mobile equipment comprising means for:

receiving a relay request message from a source user equipment, the relay request message comprising at least some information for configuring a sidelink process to obtain feedback from a target user equipment; and sending a message to the target user equipment using the configured process, wherein the message is configured for the configured process according to the received information for configuring the sidelink process to obtain feedback from a target user equipment; and sending a relay response message to the source user equipment that is indicative of an outcome of the configured process between the mobile equipment and the target user equipment.

In some but not necessarily all examples, the sidelink process with feedback is a hybrid automatic repeat request (HARQ) process with feedback enabled.

In some but not necessarily all examples, the message sent to the target user equipment using the sidelink HARQ process with feedback enabled has no transport block, and will consequently automatically produce a NACK as HARQ feedback from the target user equipment In some but not necessarily all examples, the mobile equipment comprises:

means for receiving a NACK in response to sending the sidelink message to the target user equipment, wherein the sidelink message is configured for the sidelink HARQ process with feedback enabled according to the received information for configuring the sidelink HARQ process with feedback enabled; and comprises means for sending, in response to receiving the NACK, a relay response message to the source user equipment In some but not necessarily all examples, the message is a unicast sidelink message with a source identifier being an identifier of the source user equipment and a destination identifier being an identifier of a target user equipment.

According to various, but not necessarily all, embodiments there is provided a method comprising:

receiving a relay request message from a source mobile equipment, the relay request message comprising at least some information for configuring a sidelink process to obtain feedback from a target user equipment; and sending a message to the target user equipment using the configured process, wherein the message is configured for the configured process according to the received information for configuring the sidelink process to obtain feedback from a target user equipment=; and sending a relay response message to the source mobile equipment that is indicative of an outcome of the configured process between the mobile equipment and the target user equipment.

According to various, but not necessarily all, embodiments there is provided a computer program that when loaded into a processor of user equipment causes:

receiving a relay request message from a source mobile equipment, the relay request message comprising at least some information for configuring a sidelink process to obtain feedback from a target user equipment; and sending a message to the target user equipment using the configured process, wherein the message is configured for the configured process according to the received information for configuring the sidelink process to obtain feedback from a target user equipment; and sending a relay response message to the source mobile equipment that is indicative of an outcome of the configured process between the mobile equipment and the target user equipment.

According to various, but not necessarily all, embodiments there is provided examples as claimed in the appended claims.

BRIEF DESCRIPTION

Some examples will now be described with reference to the accompanying drawings in which.

ACRONYMS

ACK Positive Acknowledgement
CBR Channel busy ratio
DTX Discontinuous transmission
HARQ Hybrid Automatic Repeat Request
ME Mobile Equipment
NACK Negative Acknowledgement
OoC Out-of-Coverage
PSCCH Physical Sidelink Control Channel
PSFCH Physical Sidelink Feedback Channel
PSSCH Physical Sidelink Shared Channel
RSSI Received Signal Strength Indicator
RSRP Reference Signal Received Power
RSRQ Reference Signal Received Quality
R-UE Relay UE
Rx UE Receiver UE
SCI Sidelink Control Information
SL Sidelink
TB Transport Block
Tx UE Transmitter UE
UE User Equipment

DETAILED DESCRIPTION

Figure 1:
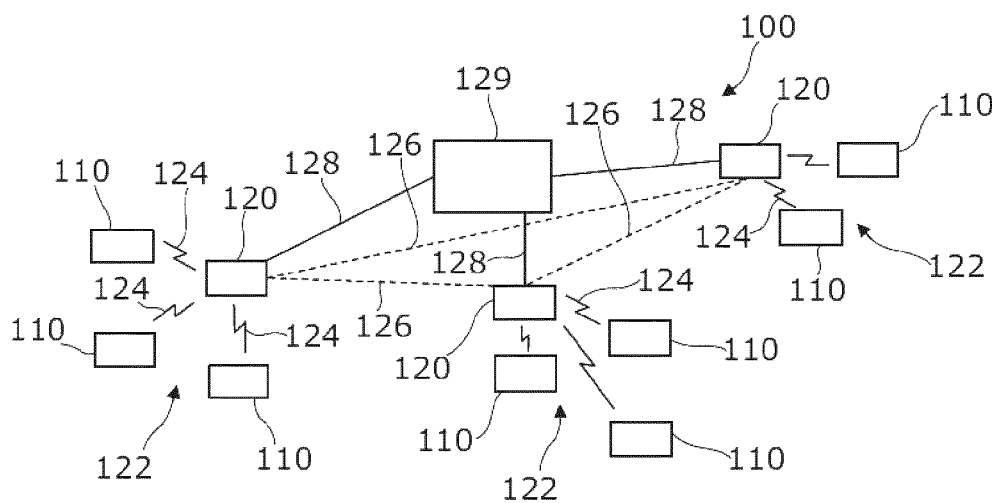
FIG. 1 shows an example of the subject matter described herein.

FIG. 1 illustrates an example of a network 100 comprising a plurality of network nodes including terminal nodes 110, access nodes 120 and one or more core nodes 129. The terminal nodes 110 and access nodes 120 communicate with each other. The one or more core nodes 129 communicate with the access nodes 120.

The network 100 is in this example a radio telecommunications network, in which at least some of the terminal nodes 110 and access nodes 120 communicate with each other using transmission/reception of radio waves.

The one or more core nodes 129 may, in some examples, communicate with each other. The one or more access nodes 120 may, in some examples, communicate with each other.

The network 100 may be a cellular network comprising a plurality of cells 122 each served by an access node 120. In this example, the interface between the terminal nodes 110 and an access node 120 defining a cell 122 is a wireless interface 124.

The access node 120 is a cellular radio transceiver. The terminal nodes 110 are cellular radio transceivers.

In the example illustrated the cellular network 100 is a third generation Partnership Project (3GPP) network in which the terminal nodes 110 are user equipment (UE) and the access nodes 120 are base stations.

In the particular example illustrated the network 100 is an Evolved Universal Terrestrial Radio Access network (E-UTRAN). The E-UTRAN consists of E-UTRAN NodeBs (eNBs) 120, providing the E-UTRA user plane and control plane (RRC) protocol terminations towards the UE 110. The eNBs 120 are interconnected with each other by means of an X2 interface 126. The eNBs are also connected by means of the S1 interface 128 to the Mobility Management Entity (MME) 129.

In other example the network 100 is a Next Generation (or New Radio, NR) Radio Access network (NG-RAN). The NG-RAN consists of gNodeBs (gNBs) 120, providing the user plane and control plane (RRC) protocol terminations towards the UE 110. The gNBs 120 are interconnected with each other by means of an X2/Xn interface 126. The gNBs are also connected by means of the N2 interface 128 to the Access and Mobility management Function (AMF).

3GPP TS 38.300 provides an overall description of NR sidelink (SL) based communication between user equipment in proximity for both in-coverage (IC) and out-of-coverage (000) operations.

Sidelink (SL) communication is based on a source user equipment (Tx UE) communicating a sidelink message to a target user equipment (Rx UE) directly over SL between Tx UE and Rx UE.

The target UE (Rx UE) monitors one or more (pre-)configured resource pool(s) for reception of a transmitted SL message. The SL message can, for example, be unicast, groupcast or broadcast.

A SL message comprises, in the SL control information, a Source ID (SRC ID) that identifies the source UE (Tx UE) and a Destination ID (DST ID) that identifies the target UE (Rx UE). They are, in part, included in SL Control Information (SCI) sent by the source UE (Tx UE) to schedule a SL transmission of a transport block (TB) and in part included in the header of MAC PDU inside the TB.

A SL message can also comprise in the SL control information (SCI): a HARQ process number, a new data indicator, a redundancy version, a HARQ feedback enabled/disabled indicator.

A SL message with HARQ feedback comprises a HARQ feedback enabled indicator.

The target UE (Rx UE) in order to receive SCI and TB, monitors over (pre-)configured resource pool(s) and filters based on the DST ID.

Sidelink HARQ with feedback uses Physical sidelink feedback channel (PSFCH) and can be operated in one of two options. In one option, PSFCH transmits either ACK or NACK using a resource dedicated to a single PSFCH transmitting UE. In another option, PSFCH transmits NACK, or no PSFCH signal is transmitted, on a resource that can be shared by multiple PSFCH transmitting UEs.

NACK only option and ACK/NACK option are available for groupcast SL message from the source UE 110 (Tx UE) to a group of target UEs (Rx UEs). ACK/NACK option is available for unicast SL between source UE 110 (Tx UE) and target UE 110 (Rx UE).

Figure 2:
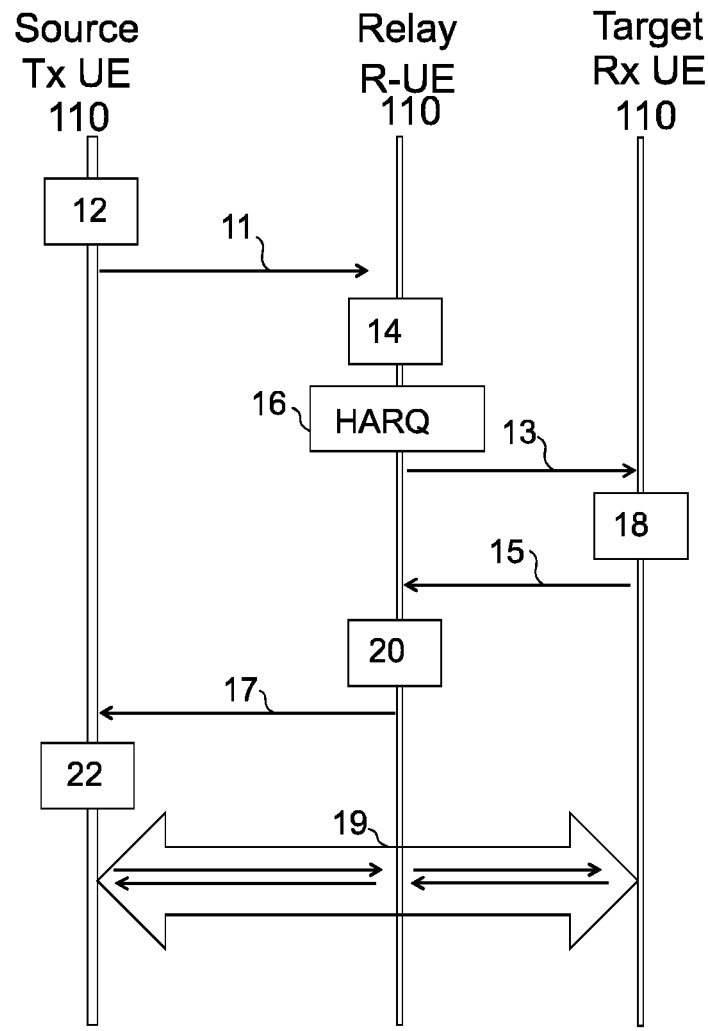
FIG. 2 shows another example of the subject matter described herein.

FIG. 2 illustrates an example in which a unicast sidelink communication channel 19 is created between a source UE 110 (Tx UE) and a target UE 110 (Rx UE) via a relay UE 110 (R-UE).

The relay UE 110 (R-UE) is configured to probe a target UE 110 (Rx UE) to find out whether the relay UE (R-UE) can reach the target UE 110 (Rx UE) in order to form the communication channel 19.

At block 12, the source UE 110 (Tx UE) determines whether or not to attempt to create a unicast sidelink communication channel 19 between the source UE 110 (Tx UE) and a target UE 110 (Rx UE) via a relay UE 110 (R-UE). The target UE 110 (Rx UE) is a known identified UE.

If it is determined to attempt to create a unicast sidelink communication channel 19 between the source UE 110 (Tx UE) and a target UE 110 (Rx UE) via a relay UE 110 (R-UE), then the source UE 110 (Tx UE) sends a relay request message 11.

The source UE 110 (Tx UE) can, for example, determine to attempt to create an indirect unicast sidelink communication channel 19 with a target UE 110 (Rx UE) via a relay UE (R-UE) 110, when the source UE 110 (Tx UE) needs to communicate with the target UE 110 (Rx UE) and there is no direct sidelink communication channel 19 or an existing direct or indirect sidelink communication channel is insufficient.

In some examples, the indirect unicast sidelink communication channel 19 via the relay UE 110 (R-UE) is a sole communication channel 19 between the source UE (Tx UE) 110 and the target UE 110 (Rx UE). In other examples, the indirect unicast sidelink communication channel 19 via the relay UE 110 (R-UE) is one of multiple parallel communication channels (not shown) between the source UE 110 (Tx UE) and the target UE 110 (Rx UE)

The relay request message 11 is sent to at least one relay UE 110 (R-UE) in proximity of the source UE (Tx UE). The relay UE 110 (R-UE) has a capability to operate as a relay to the target UE 110 (Rx UE). The identity and capability of the relay UE 110 (R-UE) to operate as a relay to the target UE 110 (Rx UE) can be known or unknown to the source UE 110 (Tx UE).

The relay request message 11 comprises at least some information for configuring a sidelink process to obtain feedback from the target user equipment.

The configured sidelink process to obtain feedback can be used for testing communication between the relay UE 110 (R-UE) and the target UE 110 (Rx UE), and in particular, for testing an onward relay sidelink between the relay UE 110 (R-UE) and the target UE 110 (Rx UE).

In at least some examples the sidelink process to obtain feedback is a sidelink transmission procedure with feedback control, as described below.

An example of a process to obtain feedback is a process that comprises, at the relay UE 110 (R-UE), transmitting a request 13 and receiving a reply 15 from the target UE 110 (Rx UE) and, at the target UE 110 (Rx UE), receiving the request 13 and transmitting the reply to the relay UE 110 (R-UE). The request 13 could, for example, be unicast, groupcast or broadcast SL message. The reply 15 could, for example, be unicast, groupcast or broadcast SL message.

Where there is or has been direct SL communication between the source UE 110 (Tx UE) and the target UE 110 (Rx UE) then the sidelink process to obtain feedback can be:
 i) a SL HARQ process, for example a SL HARQ process with feedback enabled; or
 ii) a SL measurement process.

For example (i), the relay request message 11 comprises at least some information for configuring a SL HARQ process, for example a SL HARQ process with feedback enabled, in which the relay UE 110 (R-UE) sends a request (SL message 13) and the target UE 110 (Rx UE) sends a reply (HARQ response 15).

For example (ii), the relay request message 11 comprises at least some information for configuring a SL measurement process, in which the relay UE 110 (R-UE) sends a SL measurement request 13 and the target UE 110 (Rx UE) sends a SL measurement report as a reply 15;

Option i) operates at the physical (PHY) layer (layer-1) whereas option (ii) operates at layer 2.

Where there is not or there has not been direct SL communication between the source UE 110 (Tx UE) and the target UE 110 (Rx UE) then the sidelink process to obtain feedback can be a SL set-up process.

For this example, the relay request message 11 is a sidelink message 13 comprising at least some information for configuring a SL set-up process in which the replay UE 110 (R-UE) sends a unicast SL setup request 13 to the target UE 110 (Rx UE) and receives, in reply, a SL unicast setup response 15 from the target UE 110 (Rx UE). The unicast SL setup request can be sent using HARQ with blind repetition and without feedback for example.

In overview, the sidelink process to obtain feedback from the target UE 110 (Rx UE) can therefore comprise signalling 13, 15 at layer-1 or a higher layer. The sidelink process to obtain feedback from the target UE 110 (Rx UE) can therefore comprise HARQ, with or without feedback. In case HARQ with feedback is used, the HARQ process with feedback enabled is the sidelink process to obtain feedback and the reply 15 from the target UE 110 (Rx UE) is the HARQ feedback. In case HARQ without feedback is used, the sidelink process to obtain feedback is not the HARQ process but is based on a higher-layer (above L1) procedure of the sidelink interface and the reply 15 from the target UE 110 (Rx UE) is a SL message of a higher layer for the higher-layer procedure of the sidelink.

In at least some examples, the relay request message 11 comprises at least an identifier of the source UE 110 (Tx UE) and an identifier of the target UE 110 (Rx UE).

The relay request message 11 can, for example, be a sidelink message with a source identifier (e.g. SRC ID) being an identifier of the source UE 110 (Tx UE), the relay request message 11 comprising an identifier of the target UE 110 (Rx UE).

In at least some examples, the relay request message 11 is broadcast or groupcast.

At block 14, which is optional, the relay UE 110 (R-UE) determines whether or not to send the message 13 to the target UE 110 (Rx UE).

The decision can, for example, be based upon a comparison of one or more quality metrics for the received relay request message 11 against one or more threshold conditions. Examples of quality metrics include RSSI, RSRP, RSRQ. The decision can, for example, be based upon a measurement of a power level for the received relay request message 11 and a comparison of the measured power level against a decision threshold. The message 13 is not, for example, sent to the target UE 110 (Rx UE) if the link between the relay UE 110 (R-UE) and the source UE 110 (Tx UE) is poor or unreliable.

The relay UE 110 (R-UE) sends the message 13 to the target UE 110 (Rx UE) using the sidelink process for obtaining feedback from the target UE 110 (Rx UE).

In at least some examples, the message 13 is a unicast sidelink message 13 with a source identifier being an identifier of the source UE 110 (Tx UE) (not the relay UE 110 (R-UE)) and a destination identifier being an identifier of a target UE 110 (Rx UE). The sidelink message 13 spoofs the identifier of the source UE 110 (Tx UE) as its source.

The target UE 110 (Rx UE) receives the message 13, performs, at block 18, a part of the sidelink process for obtaining feedback, and sends in reply a response message 15.

The relay UE 110 (R-UE) receives the response message 15 in response to sending the message 13 to the target UE 110 (Rx UE)

The relay UE 110 (R-UE) sends, in response to receiving the response message, a relay response message 17 to the source UE 110 (Tx UE) that is indicative of an outcome of the sidelink process for obtaining feedback.

In at least some examples, the relay response message 17 is configured to identify or enable identification of the relay UE 110 (R-UE). In at least some examples, the relay response message 17 is additionally configured to identify or enable identification of the target UE 110 (Rx UE).

If the relay response message 17 is a unicast SL message, the message can comprise, as a source identifier (e.g. SRC ID), an identifier of the relay UE 110 (R-UE) and as a destination identifier (e.g. DST ID), an identifier of the source UE 110 (Tx UE). In some examples, an information element of the message comprises an identifier of the target UE 110 (Rx UE).

If the relay response message 17 is a unicast SL message, the relay UE 110 (R-UE) can spoof its identity and, the message can comprise, as a source identifier (e.g. SRC ID), an identifier of the target UE 110 (Rx UE) and as a destination identifier (e.g. DST ID), an identifier of the source UE 110 (Tx UE). An information element of the message comprises an identifier of the relay UE (R-UE).

If the relay response message 17 is a broadcast or groupcast SL message, an information element of the message can comprise an identifier of the relay UE (R-UE) and an identifier of the source UE 110 (Tx UE). In some examples, an information element can comprise an identifier of the target UE 110 (Rx UE).

In at least some examples, the relay response message 17 is configured to convey capabilities of the relay UE 110 (R-UE) and/or convey measurements of the relay UE 110 (R-UE) or details of the sidelink process configured, by the relay request message 11, to enable the relay UE 110 (R-UE) to obtain feedback from the target UE 110 (Rx UE).

The relay response messages 17 can be a pre-defined protocol data unit (PDU) of sidelink radio resource control (SL RRC) protocol or, in general, a sidelink control protocol, for example. Thus, it is expected that there are at least a unique ID of this PDU and one or more information elements (IEs) comprised in such a PDU. IEs may include for examples an identifier of the targeted UE 110 (Rx UE), capability of the relay UE 110 (R-UE) which sends this PDU, report of the outcome of the HARQ process (e.g., number of NACKs received and/or measurement on the received NACKs from the target UE), etc.

The Tx UE after sending the relay request may start a timer to wait for one or more relay response message(s) 17 from one or more relay UEs 110 (R-UEs). The relay request message 11 and the relay response message 17 are expected as of the same SL control protocol. The relay response message 17 should implicitly or explicitly identify the corresponding relay request message 11 (with, e.g., ID of the source UE (Tx UE) and/or sequence number of the relay request).

In some but not necessarily all examples, sending the relay response message 17 to the source UE 110 (Tx UE) is conditional. For example, at block 20, which is optional, the relay UE 110 (R-UE) determines whether or not to send the relay response message 17 to the source UE 110 (Tx UE).

The decision can, for example, be based upon a comparison of one or more quality metrics for the received response message 15 against one or more threshold conditions. Examples of quality metrics include RSSI, RSRP, RSRQ. The decision can, for example, be based upon a measurement of a power level for the received response message 15 and a comparison of the measured power level against a decision threshold. The relay response message 17 is not, for example, sent to the source UE 110 (Tx UE) if the link between the relay UE 110 (R-UE) and the target UE 110 (Rx UE) is poor or unreliable.

The source UE 110 (Tx UE) receives the relay response message 17 from the relay UE 110 (R-UE) that is indicative of successful communication 13, 15 between the relay UE 110 (R-UE) and the target UE 110 (Rx UE)

At block 22 the source UE 110 (Tx UE) determines whether or not to establish a communication channel 19.

The decision can, for example, be based upon a comparison of one or more quality metrics for the received relay response message 17 against one or more threshold conditions. Examples of quality metrics include RSSI, RSRP, RSRQ. The decision can, for example, be based upon a measurement of a power level for the received relay response message 17 and a comparison of the measured power level against a decision threshold. The sidelink communication channel 19 is not, for example, sent to the target UE 110 (Rx UE) if the link between the relay UE 110 (R-UE) and the source UE 110 (Tx UE) is poor or unreliable.

In other examples, the decision is additionally or alternatively based on measurements made at block 14 and/or 18 and/or 20 and included in the received relay response message 17.

Where multiple alternative relay UEs 110 (R-UE) are available for forming the communication channel 19, the source UE 110 (Tx UE) at block 22, can select a relay UE 110 (R-UE) for use in the sidelink communication channel 19.

Finally a unicast sidelink communication channel 19 is created between the source UE 110 (Tx UE) and the target UE 110 (Rx UE) via the relay UE 110 (R-UE).

It will be appreciated from the foregoing that the source UE 110 (Tx UE) comprises means for:
  determining to attempt to create a unicast sidelink communication channel 19 between the mobile equipment 110 and an identified target UE 110 (Rx UE) via a relay UE 110 (R-UE); and
  sending a relay request message 11 to at least one user equipment 110, operable as a relay to the target UE 110 (Rx UE), wherein the relay request message 11 comprises at least some information for configuring a sidelink process to obtain feedback from the target user equipment.

The mobile equipment (ME) used by the source UE 110 (Tx UE) comprises means for: determining to attempt to create a unicast sidelink communication channel 19 between the mobile equipment 110 and an identified target UE 110 (Rx UE) via a relay UE 110 (R-UE); and
  sending a relay request message 11 to at least one user equipment 110, operable as a relay to the target UE 110 (Rx UE), wherein the relay request message 11 comprises at least some information for configuring a sidelink process to obtain feedback from the target user equipment.

The ME/UE also comprises means for receiving a relay response message 17 from the relay UE 110 (R-UE) indicative of communication 13, 15 between the relay UE 110 (R-UE) and the target UE 110 (Rx UE) that occurs during sidelink process that is configured to obtain feedback from the target UE 110 (Rx UE).

In at least some examples, the relay request message 11 comprises at least some information for configuring a sidelink HARQ process with feedback enabled between the relay UE 110 (R-UE) and the target UE 110 (Rx UE). The relay UE 110 (R-UE) sends a sidelink message 13 to the target UE 110 (Rx UE) using the sidelink HARQ process 16 with feedback enabled. The target UE 110 (Rx UE) receives the sidelink message 13, performs, at block 18, a part of the HARQ process with feedback, and sends in reply a HARQ response message 15, which in some examples is a NACK.

The configured HARQ process with feedback enabled can be used for testing communication between the relay UE 110 (R-UE) and the target UE 110 (Rx UE), and in particular, for testing an onward relay sidelink between the relay UE 110 (R-UE) and the target UE 110 (Rx UE).

In at least some examples, the information, comprised in the relay request message 11, explicitly or implicitly enables a relay UE 110 (R-UE) to send a unicast sidelink message 13 with a source identifier (e.g. SRC ID) being an identifier of the source UE 110 (Tx UE) and a destination identifier (e.g. DST ID) being an identifier of the target UE 110 (Rx UE) using the sidelink HARQ process 16 with feedback enabled.

The information, comprised in the relay request message 11, can explicitly or implicitly specify the sidelink HARQ process with feedback enabled.

In at least some examples, the information, comprised in the relay request message 11, explicitly specifies no transport block for the sidelink HARQ process with feedback enabled between the relay UE 110 (R-UE) and the target UE 110 (Rx UE).

In at least some examples, the relay request message 11 comprises at least an identifier of the source UE 110 (Tx UE) and an identifier of the target UE 110 (Rx UE).

The relay UE 110 (R-UE) sends the sidelink message 13 to the target UE 110 (Rx UE) using the sidelink HARQ process 16 with feedback enabled.

The sidelink message 13 is configured for the sidelink HARQ process 16 with feedback enabled according to the information for configuring the sidelink HARQ process 16 with feedback enabled received in the relay request message 11.

In at least some examples, the sidelink message 13 is a unicast sidelink message 13 with a source identifier being an identifier of the source UE 110 (Tx UE) (not the relay UE 110 (R-UE)) and a destination identifier being an identifier of a target UE 110 (Rx UE). The sidelink message 13 spoofs the identifier of the source UE 110 (Tx UE) as its source.

In at least some example, the sidelink message 13 sent to the target UE 110 (Rx UE) using the sidelink HARQ process 16 with feedback enabled has no transport block, and will consequently automatically produce a NACK as HARQ feedback from the target UE 110 (Rx UE).

The target UE 110 (Rx UE) receives the sidelink message 13, performs, at block 18, a part of the HARQ process with feedback, and sends in reply a HARQ response message 15, which in some examples is a NACK.

The relay UE 110 (R-UE) receives the HARQ response message 15 in response to sending the sidelink message 13 to the target UE 110 (Rx UE)

The relay UE 110 (R-UE) sends, in response to receiving the HARQ response message, a relay response message 17 to the source UE 110 (Tx UE) that is indicative of an outcome of the sidelink HARQ process.

In some but not necessarily all examples, sending the relay response message 17 to the source UE 110 (Tx UE) is conditional. For example, at block 20, which is optional, the relay UE 110 (R-UE) determines whether or not to send the relay response message 17 to the source UE 110 (Tx UE). The decision can, for example, be based upon a comparison of one or more quality metrics for the received HARQ response message 15 against one or more threshold conditions. Examples of quality metrics include RSSI, RSRP, RSRQ. The decision can, for example, be based upon a measurement of a power level for the received HARQ response message 15 and a comparison of the measured power level against a decision threshold. The relay response message 17 is not, for example, sent to the source UE 110 (Tx UE) if the link between the relay UE 110 (R-UE) and the target UE 110 (Rx UE) is poor or unreliable.

It will be appreciated from the foregoing that the source UE 110 (Tx UE) can comprise means for:
  determining to attempt to create a unicast sidelink communication channel 19 between the mobile equipment 110 and an identified target UE 110 (Rx UE) via a relay UE 110 (R-UE); and
  sending a relay request message 11 to at least one user equipment 110, operable as a relay to the target UE 110 (Rx UE), wherein the relay request message 11 comprises at least some information for configuring a sidelink hybrid automatic repeat request (HARQ) process 16 with feedback enabled.

The mobile equipment (ME) used by the source UE 110 (Tx UE) can comprise means for:

determining to attempt to create a unicast sidelink communication channel 19 between the mobile equipment 110 and an identified target UE 110 (Rx UE) via a relay UE 110 (R-UE); and sending a relay request message 11 to at least one user equipment 110, operable as a relay to the target UE 110 (Rx UE), wherein the relay request message 11 comprises at least some information for configuring a sidelink hybrid automatic repeat request (HARQ) process 16 with feedback enabled.

The ME/UE also comprises means for receiving a relay response message 17 from the relay UE 110 (R-UE) indicative of communication 13, 15 between the relay UE 110 (R-UE) and the target UE 110 (Rx UE) that occurs during the sidelink hybrid automatic repeat request (HARQ) process 16 with feedback enabled.

The relay response message 17 can, in some examples, be indicative of a HARQ NACK communication 15 to the relay UE 110 (R-UE) from the target UE 110 (Rx UE) in reply to a sidelink message 13 sent from the relay UE 110 (R-UE) to the target UE 110 (Rx UE) by using the sidelink HARQ process 16 with feedback enabled.

The relay request message 11 can be a sidelink message with a source identifier being an identifier of the mobile equipment 110, the relay request message 11 comprising an identifier of the target UE 110 (Rx UE). The relay request message 11 can be broadcast or groupcast.

The information, comprised in the relay request message 11, explicitly or implicitly enables a relay UE 110 (R-UE) to send a unicast sidelink message 13 with a source identifier being an identifier of the mobile equipment 110 and a destination identifier being an identifier of the target UE 110 (Rx UE) using the sidelink HARQ process 16 with feedback enabled.

It will also be appreciated from the foregoing that the relay UE 110 (R-UE) comprises means for:

receiving a relay request message 11 from a source UE 110 (Tx UE), the relay request message 11 comprising at least some information for configuring a sidelink process to obtain feedback from the target user equipment (e.g. configuring a sidelink hybrid automatic repeat request (HARQ) process 16 with feedback enabled); and sending a message (e.g. sidelink message 13) to a target UE 110 (Rx UE) using the configured process (e.g. the sidelink HARQ process 16 with feedback enabled), wherein the message (e.g. sidelink message 13) is configured for the configured process (e.g. the sidelink HARQ process 16 with feedback enabled) according to the received information for configuring a sidelink process to obtain feedback from the target user equipment (e.g. configuring the sidelink HARQ process 16 with feedback enabled); and sending a relay response message 17 to the source UE 110 (Tx) that is indicative of an outcome of the configured process (e.g. the sidelink HARQ process) between the relay UE 110 (R-UE) and the target UE 110 (Rx UE).

The mobile equipment (ME) used by the relay UE 110 (R-UE) comprises means for: receiving a relay request message 11 from a source UE 110 (Tx UE), the relay request message 11 comprising at least some information for configuring a sidelink process to obtain feedback from the target user equipment (e.g. configuring a sidelink hybrid automatic repeat request (HARQ) process 16 with feedback enabled); and sending a message (e.g. a sidelink message 13) to a target UE 110 (Rx UE) using the configured process (e.g. the sidelink HARQ process 16 with feedback enabled), wherein the message (e.g. the sidelink message 13) is configured for the configured process (e.g. the sidelink HARQ process 16 with feedback enabled) according to the received information for configuring a sidelink process to obtain feedback from the target user equipment (e.g. configuring the sidelink HARQ process 16 with feedback enabled); and sending a relay response message 17 to the source UE 110 (Tx UE) that is indicative of an outcome of the configured process (e.g. the sidelink HARQ process) between the mobile equipment 110 and the target UE 110 (Rx UE).

The message 13 can be a unicast sidelink message 13 with a source identifier being an identifier of the source UE 110 (Tx UE) and a destination identifier being an identifier of a target UE 110 (Rx UE).

In some examples, the sidelink message 13 sent to the target UE 110 (Rx UE) using the sidelink HARQ process 16 with feedback enabled has no transport block, and will consequently automatically produce a NACK as HARQ feedback from the target UE 110 (Rx UE).

The UE/ME can additionally comprises means for receiving a NACK 15 in response to sending the sidelink message 13 to the target UE 110 (Rx UE), wherein the sidelink message 13 is configured for the sidelink HARQ process 16 with feedback enabled according to the received information for configuring the sidelink HARQ process 16 with feedback enabled; and comprises means for sending, in response to receiving the NACK, a relay response message 17 to the source UE 110 (Tx UE).

Figure 3A:
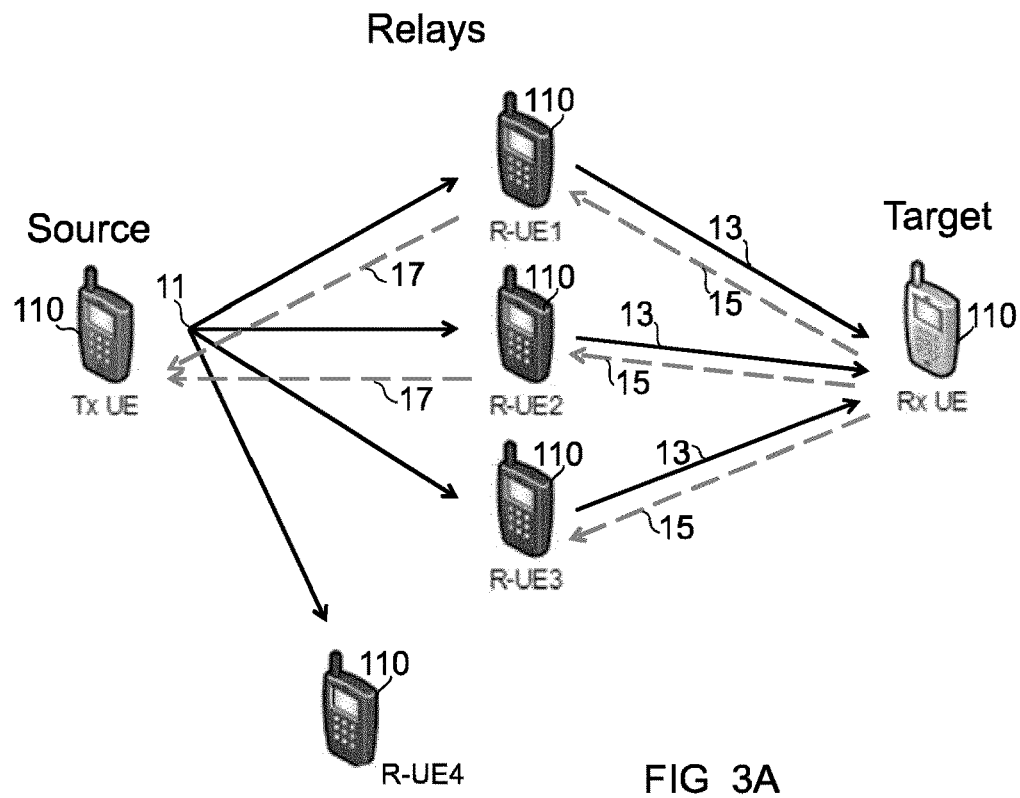
FIG. 3A shows another example of the subject matter described herein.

FIG. 3A illustrates how the example illustrated in FIG. 2 can be extended to include multiple candidate relay UEs 110 (R-UE1, R-UE2, R-UE3, R-UE4).

There are multiple candidate relay UEs 110 (R-UEs) in proximity to the source UE 110 (Tx UE) that could be a serving relay UE 110 (R-UE) in a sidelink communication channel 19. Each candidate relay UEs (R-UE) is configured to probe a target UE (Rx UE) to find out whether the relay UE (R-UE) can reach the target UE (Rx UE) in order to form the communication channel 19.

In at least some example, the probing uses SL HARQ so that the probing is seen by the target UE 110 (Rx UE) as a regular SL procedure initiated from the source UE 110 (Tx UE) for backward compatibility.

The source UE 110 (Tx UE) sends (by broadcast or groupcast) a relay request message 11 to a plurality of relay UEs 110 (R-UEi). The relay request message 11 comprises at least some information for configuring a sidelink process to obtain feedback from the target user equipment. In at least some examples, the relay request message 11 comprises at least an identifier of the source UE 110 (Tx UE) and an identifier of the target UE 110 (Rx UE). The relay request message 11 can, for example, be a sidelink message with a source identifier (e.g. SRC ID) being an identifier of the source UE 110 (Tx UE), the relay request message 11 comprising an identifier of the target UE 110 (Rx UE). In this example, the information, comprised in the relay request message 11, configures a sidelink hybrid automatic repeat request (HARQ) with feedback enabled. The information in some examples explicitly specify no transport block for the sidelink HARQ process with feedback enabled.

One or more relay UEs 110 (R-UE4) can determine not to send the sidelink message 13 to the target UE 110 (Rx UE) in response to receiving the relay request message 11.

One or more relay UEs 110 (R-UE1, R-UE2, R-UE3) can determine to send the sidelink message 13 to the target UE 110 (Rx UE) in response to receiving the relay request message 11.

The sidelink message 13 is configured for the sidelink HARQ process with feedback enabled according to the information for configuring the sidelink HARQ process with feedback enabled received in the relay request message 11.

The sidelink message 13 is sent by different relay UEs 110 (R-UE1, R-UE2 and R-UE3) using the same SCI per each scheduled HARQ transmission of the common HARQ process, and the same resource configured by the source UE 110 (Tx UE) and therefore appear to the target UE 110 (Rx UE) as the same SCI per each scheduled HARQ transmission from the source UE 110 (Tx UE).

The source UE 110 (Tx UE) and/or the serving network can, in at least some examples, control involved relay UEs 110 (R-UEs) so that all the involved relay UEs 110 (R-UEs) will send the same SCI using the same resources to the target UE 110 (Rx UE) for the common HARQ process with feedback enabled. Thus, the contents of this same SCI including HARQ configuration may be determined and provided to the involved relay UEs 110 (R-UEs) by the source UE 110 (Tx UE) e.g. on-the-fly and/or by the serving network e.g. in advance.

In some examples the source UE 110 (Tx UE) is configured to control the relay UEs 110 (R-UEi) so that, for example, a minimum number of HARQ (re-)transmissions will be sent and/or controlling which relay UEs 110 (R-UEj) send which HARQ (re-)transmissions. All relay UEs 110 (R-UEi) can monitor fora HARQ response message 15 (e.g. NACK) per each of the HARQ (re-)transmissions.

In at least some examples, the sidelink message 13 is a unicast sidelink message 13 with a source identifier being an identifier of the source UE 110 (Tx UE) (not the relay UE 110 (R-UEi)) and a destination identifier being an identifier of a target UE 110 (Rx UE). The sidelink message 13 spoofs the identifier of the source UE 110 (Tx UE) as its source.

In at least some examples, the sidelink message 13 sent to the target UE 110 (Rx UE) using the sidelink HARQ process 16 with feedback enabled has no transport block, and will consequently automatically produce a NACK as HARQ feedback from the target UE 110 (Rx UE).

The target UE 110 (Rx UE) receives the sidelink message 13 and sends in reply a HARQ response message 15, which in some examples is a NACK.

The relay UE 110 (R-UE) receives the HARQ response message 15 in response to sending the sidelink message 13 to the target UE 110 (Rx UE).

For example, NACK is sent back, as the target UE 110 (Rx UE) receives SCI but not a transport block. All relay UEs 110 (R-UEi) can monitor for the HARQ response message 15 (e.g. NACK) regardless of whether involved sending the sidelink message 13 or not.

If the HARQ response message 15 (e.g. NACK) is not received, the SCI of the sidelink message 13 can be updated to increment the HARQ transmission #(i+1) of the common HARQ process) and it is then retransmitted. This retransmission may be configured by the source UE110 (Tx UE) with the information comprised in the relay request message for configuring the HARQ process with feedback enabled.

The relay UE 110 (R-UE) can send, in response to receiving the HARQ response message 15, a relay response message 17 to the source UE 110 (Tx UE) that is indicative of an outcome of the sidelink HARQ process.

In some but not necessarily all examples, sending the relay response message 17 to the source UE 110 (Tx UE) is conditional. For example, one or more relay UEs 110 (e.g. R-UE3) can determine not to send the relay response message 17 to the source UE 110 (Tx UE) and one or more relay UEs 110 (e.g. R-UE1, R-UE-2) can determine to send the relay response message 17 to the source UE 110 (Tx UE).

A relay UE 110 (R-UEi) can determine whether or not to send the relay response message 17 based on received one or more HARQ response messages 15 (e.g. NACKs) from the target UE 110 (Rx UE) during the configured common HARQ process. For example, sending the relay response message 17 can be based upon the number of HARQ response messages 15 (e.g. NACKs) received from the target UE 110 (Rx UE) and/or a power measurement (e.g. RSRP) of one or more HARQ response messages 15 (e.g. NACKs) being above a threshold, which can, for example, be configured by the source UE 110 (Tx UE).

The source UE 110 (Tx UE) receives the relay response message 17 from multiple relay UEs 110 (R-UE1, R-UE2) that is indicative of successful communication 13, 15 between the respective relay UE 110 (R-UE1, R-UE2) and the target UE 110 (Rx UE).

The source UE 110 (Tx UE) select a relay UE 110 (e.g. R-UE1) for use, as a serving relay UE, in the sidelink communication channel 19. Finally, as illustrated in FIG. 3B, a unicast sidelink communication channel 19 is created between the source UE 110 (Tx UE) and the target UE 110 (Rx UE) via the selected relay UE 110 (e.g. R-UE1).

In some examples, a SL-based UE-to-UE relay may be used for providing or enhancing service continuity, power efficiency, or QoS for an ongoing unicast SL between source UE 110 (Tx UE) and the target UE 110 (Rx UE).

For example, a SL-based UE to-UE relay may be used as a primary option for possible recovery from a SL radio link failure, especially for OoC operation. A SL-based UE-to-UE relay may be used as a replacement of the direct SL for proactive avoidance of SL radio link failure or to reduce transmit power and therefore power consumption for the source UE 110 (Tx UE). SL-based UE-to-UE relay may also be used as a secondary connection in addition to the direct SL for providing or enhancing QoS for the unicast SL between the source UE 110 (Tx UE) and the target UE 110 (Rx UE), as needed for high-reliability communications over SL for example.

Figure 3B:
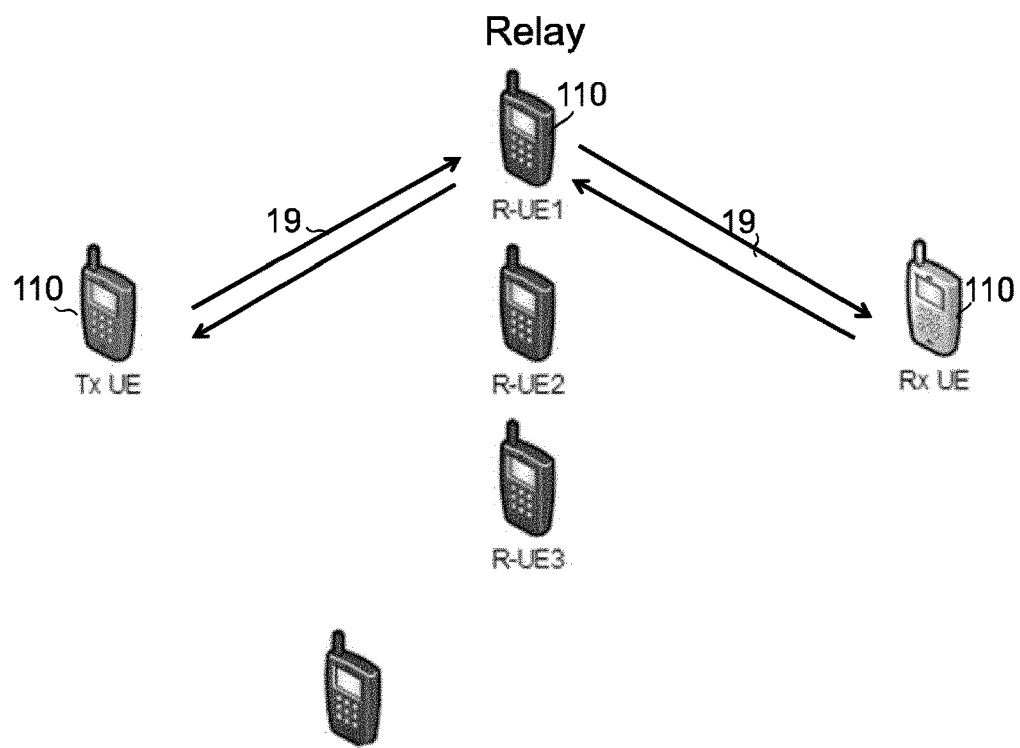
FIG. 3B shows another example of the subject matter described herein.
Figure 4:
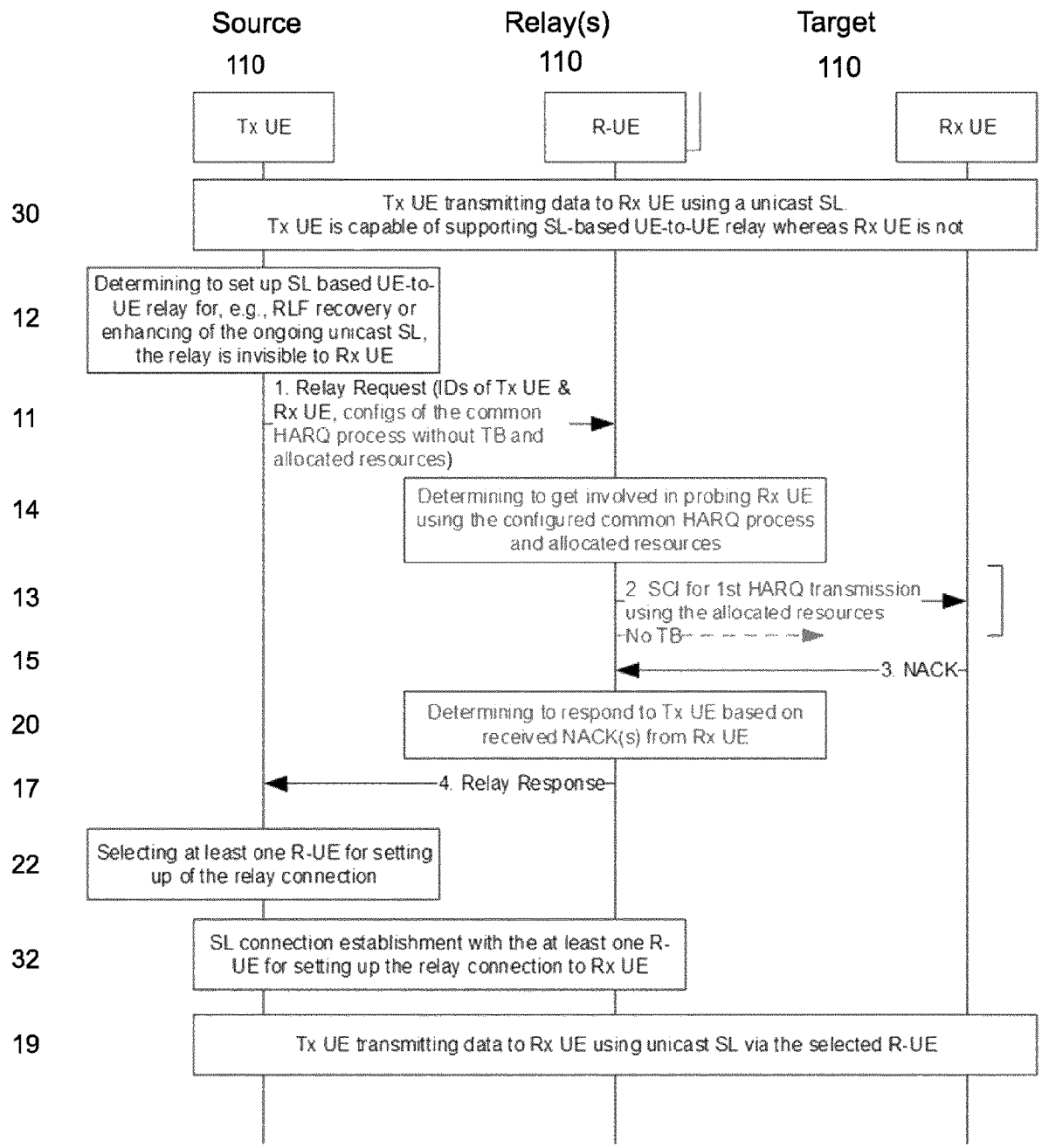
FIG. 4 shows another example of the subject matter described herein.

FIG. 4 illustrates a setup of a SL-based UE-to-UE relay as previously described in FIGS. 2, 3A and 3B. In this example, the SL-based UE-to-UE relay for an ongoing unicast SL between source UE 110 (Tx UE) and the target UE 110 (Rx UE) via the relay UE 110 (R-UE) is invisible to the target UE 110 (Rx UE) in supporting the backward compatibility.

In this example, the source UE 110 (Tx UE) is configured to coordinate and control relay UEs 110 (R-UEi) to probe the target UE 110 (Rx UE) via the use of the common HARQ process with feedback enabled without a scheduled transport block.

The control can be by the source UE 110 (Tx UE) for on-the-fly control and/or by the serving network for semi-static control and/or be by a SIM-based pre-configuration for out-of-coverage operation.

At block 30, the source UE 110 (Tx UE) is transmitting data to a target UE 110 (Rx UE) using a unicast sidelink communications channel. In this example, the source UE 110 (Tx UE) is capable of supporting SL-based UE-to-UE relay whereas the target UE 110 (Rx UE) is not necessarily capable.

At block 12, the source UE 110 (Tx UE) determines to set up SL based UE-to-UE relay, due to one of the aforementioned use cases for example. The source UE 110 (Tx UE)

determines whether or not to attempt to create a unicast sidelink communication channel 19 between the source UE 110 (Tx UE) and a target UE 110 (Rx UE) via a relay UE 110 (R-UE).

If it is determined to attempt to create a unicast sidelink communication channel 19 between the source UE 110 (Tx UE) and the target UE 110 (Rx UE) via a relay UE 110 (R-UE), then the source UE 110 (Tx UE) sends a relay request message 11.

The source UE 110 (Tx UE) sends (by broadcast or groupcast) a relay request message 11 to one or more relay UEs 110 (R-UEi) which may be known or unknown to the source UE110 (Tx UE). The relay request message 11 comprises at least some information for configuring a sidelink hybrid automatic repeat request (HARQ) process with feedback enabled. In this example, the relay request message 11 is a sidelink message with a source identifier (e.g. SRC ID) being an identifier of the source UE 110 (Tx UE). The relay request message 11 comprises an identifier of the target UE 110 (Rx UE). In at least some examples, the information, comprised in the relay request message 11, explicitly specifies no transport block for the sidelink HARQ process with feedback enabled.

At block 14, a relay UE 110 (R-UE) determines whether or not to get involved in probing the target UE 110 (Rx UE) using the configured common HARQ process and allocated resources configured by the relay request message 11.

One or more relay UEs 110 (R-UE4) can determine not to send the sidelink message 13 to the target UE 110 (Rx UE) in response to receiving the relay request message 11.

One or more relay UEs 110 (R-UE1, R-UE2, R-UE3) can determine to send the sidelink message 13 to the target UE 110 (Rx UE) in response to receiving the relay request message 11.

In this example, the sidelink message 13 sent to the target UE 110 (Rx UE) using the sidelink HARQ process with feedback enabled has no transport block, and will consequently automatically produce a NACK as HARQ response message 15 from the target UE 110 (Rx UE).

The relay UEs 110 (R-UEs) are configured by the relay request message 11 to use a common, feedback-enabled SL HARQ process but without transmitting an actual transport block (TB) to probe the target UE 110 (Rx UE). The common HARQ process with feedback without the TB causes the target UE 110 (Rx UE) to keep sending NACK as long as they receive HARQ (re-)transmission e.g. sidelink messages 13 sent by the relay UEs 110 (R-UEs). The HARQ (re-) transmission comprise the sidelink control information (SCI) but no transport block (TB) as scheduled in the SCI.

In this example, the sidelink message 13 is a unicast sidelink message 13 with a source identifier being an identifier of the source UE 110 (Tx UE) (not the relay UE 110 (R-UEi)) and a destination identifier being an identifier of the target UE 110 (Rx UE). The sidelink message 13 spoofs the identifier of the source UE 110 (Tx UE) as its source. This provides for backwards compatibility with a legacy target UE 110 (Rx UE).

More than one relay UE 110 (R-UE) can send the same SCI using the same allocated resources, in a sidelink message 13 per each HARQ (re-)transmission of the configured common HARQ process.

Based on monitoring NACK from the target UE 110 (Rx UE) per each transmitted HARQ (re-)transmission during the common HARQ process, individual relay UEs 110 (R-UE) are able to determine whether the target UE 110 (Rx UE) can be reached properly or not and therefore respond to the relay request message 11 of the source UE 110 (Tx UE) or not.

It should be noted that a relay UE 110 (R-UE) can receive, and act upon, a NACK that is response to a sidelink message 13 sent by a different relay UE 110 (R-UE).

In case NACK 15 is not received from the target UE 110 (Rx UE) during the common HARQ process (meaning HARQ DTX), the target UE 110 (Rx UE) is considered unreachable to corresponding relay UE 110 (R-UEi) and the corresponding relay UE 110 (R-UEi) may not need to send a relay response message 17 to the source UE 110 (Tx UE).

At block 20 the relay UE 110 (R-UE) determines whether or not to send the relay response message 17. The decision can be based on received NACK(s) 15 from the target UE 110 (Rx UE).

In some but not necessarily all examples, sending the relay response message 17 to the source UE 110 (Tx UE) is conditional, as previously described.

The relay UE 110 (R-UE) can send, in response to receiving the HARQ response message 15, a relay response message 17 to the source UE 110 (Tx UE) that is indicative of an outcome of the sidelink HARQ process. The relay response message 17 is a unicast sidelink message in this example. The ID of the involved target UE 110 (Rx UE) is used as the source ID (SRC ID) and the ID of the source UE 110 (Tx UE) is used as the destination ID (DST ID) of the relay response message 15.

At block 22 the source UE 110 (Tx UE) determines whether or not to establish a communication channel 19. The source UE 110 (Tx UE) selects at least one relay UE 110 (R-UE) that has sent a relay response message 17 as a serving relay UE for the SL communication channel 19. Thus, based on the received relay response messages 17, the source UE 110 (Tx UE) may select one or more best suitable relay UEs 110 (R-UE) for the current requirements of the source UE 110 (Tx UE).

At block 32, there is SL connection establishment with the selected relay UE 110 for setting up the relay connection to the source UE 110 (Rx UE). The source UE 110 (Tx UE) can initiate the actual relay connection setup to the selected individual relay UE 110 (R-UE). For examples, the source UE 110 (Tx UE) can send a UE-to-UE Relay Connection Setup Request message to the selected relay UE 110 (R-UE). This message may provide the selected relay UE 110 (R-UE) with further configurations related to the SL communication between the source UE 110 (Tx UE) and the target UE 110 (Rx UE) and SL communication between source UE 110 (Tx UE) and the selected relay UE 110 (R-UE). The selected relay UE 110 (R-UE) may respond to the source UE 110 (Tx UE) with a UE-to-UE Relay Connection Setup Complete message. Then, the source UE 110 (Tx UE) can start using the established UE-to-UE relay connection, the channel 19, for actual SL data transmission to and/or from the target UE 110 (Rx UE).

A unicast sidelink communication channel 19 for data transmission is this created and used between the source UE 110 (Tx UE) and the target UE 110 (Rx UE) via the selected relay UE 110.

In one embodiment, the configurations of the common HARQ process with feedback (for example, without TB) may be in part provided to the source UE 110 (Tx UE) and relay UEs 110 (R-UEs) as semi-static configurations by the serving network using dedicated or common signalling or as a SIM-based pre-configuration.

The configurations of the common HARQ process with feedback may include, for example, HARQ process ID, maximum number of HARQ transmissions, transmit power, contents of SCI to be sent to target UE 110 (Rx UE) as if for scheduling a regular HARQ transmission of a TB, etc.

Rules for relay UEs 110 (R-UEs) to transmit HARQ transmissions 13 and monitor NACK 15 from the target UE 110 (Rx UE) can be included in the common HARQ process configuration.

In one example, the rules may cause an involved relay UE 110 (R-UE) to transmit at least k HARQ (re-)transmissions 13 and monitor at least i HARQ NACKs 15 during the configured common HARQ process, k and i are under the maximum number of HARQ (re-) transmissions.

In another example, the rules may cause an involved relay UE 110 (R-UE) to keep transmitting HARQ (re-)transmissions 13 and monitoring HARQ NACKs 15 until either HARQ NACK(s) 15 is (are) received properly or the maximum number of HARQ transmissions 13 is reached for the configured common HARQ process.

In one embodiment, the configurations of the common HARQ process with feedback enabled (for example, without TB) can be in part determined and provided to the relay UEs 110 (R-UEs) by the source UE 110 (Tx UE) on the fly along with the relay request message 11. In this case, the configurations may be adapted to allocated resources to be used by relay UEs 110 (R-UEs) for transmitting the HARQ (re-) transmissions 13 and/or proximity awareness (such as pre-discovered relay UEs 110 (R-UEs) and/or measured SL traffic load or CBR in proximity), as determined by the source UE 110 (Tx UE).

The configurations and allocated resources can cause the same SCI to be used for the HARQ (re) transmissions 13 on the same resources from the different relay UEs 110 (R-UEs).

If the source UE 110 (Tx UE) does not provide any configurations or allocated resources for the common HARQ process with feedback enabled, the relay UEs 110 (R-UE) would need to coordinate the transmission of SCIs to the target UE 110 (Rx UE) among themselves. This is impractical.

In one embodiment, an involved relay UE 110 (R-UE) is configured to send a relay response message 17 to the source UE 110 (Tx UE) when the involved relay UE 110 (R-UE) receives NACK(s) 15 from the target UE 110 (Rx UE) properly during the common HARQ process such that, e.g., at least m NACKs 15 are received (m=1 is enough but more than one may be used for reassuring purposes especially when the common HARQ process is configured with a fixed number of HARQ (re-)transmissions to be sent by R-UEs) and/or NACK 15 is received with a received signal strength above a preconfigured threshold level. Otherwise, the involved relay UE 110 (R-UE) can stop participating and not send the relay response message 17.

In one embodiment, the relay response message 17 can indicate the number of received NACKs 15 and/or the received signal strength of the latest received NACK 15.

In one embodiment, the source UE 110 (Tx UE) can select more than one relay UE 110 (R-UE) out of those relay UEs 110 (R-UEs) from which relay response messages 17 are received for setting up the relayed connections to target UE 110 (Rx UE). There can be multiple parallel unicast SL communication channels 19 between the source UE 110 (Tx UE) and the target UE 110 (Rx UE) that each have a different relay UE 110 (R-UE).

It is noted that the proposed method, using the common HARQ process with feedback enabled (for example, without TB) to enable relay UEs 110 (R-UE) to probe the target UE 110 (Rx UE) for SL-based UE-to-EU relay setup may be applied in general, whether the relay needs to be invisible/transparent to the target UE 110 (Rx UE) or not.

The HARQ process with feedback enabled provides a controllable, fast and efficient process to check the communication between a relay UE 110 (R-UE) and a target UE 110 (Rx UE) with minor impact to existing standards. However, where visibility is allowed, more optimization is possible. For example, SCI sent by a relay UE 110 (R-UE) to the target UE 110 (Rx UE) for probing could be in a new format.

In the above described examples, a unicast sidelink communication channel 19 is created between a source UE 110 (Tx UE) and a target UE 110 (Rx UE) via a single relay UE 110 (R-UE). This is achieved in a manner that has minimum impact to the existing 3GPP specifications, no new physical layer channel/signal is required instead the existing sidelink HARQ with feedback is repurposed in a manner that creates not only backwards compatibility (transparent to the target UE 110) but also a process that is fast, robust and efficient.

However, examples are not necessarily limited to the use of the configured common HARQ process with feedback enabled for allowing one or more relay UE(s) (R-UE(s)) to probe the target UE (Rx UE). In general, a sidelink communication procedure with feedback control may be used. The use of the sidelink communication procedure with feedback control (including the HARQ process with feedback enabled) is configured and controlled by the source UE (Tx UE) and/or the serving network and/or SIM-based pre-configuration (e.g., for out-of-coverage operation).

In at least some of the preceding examples, the relay request message 11 can additionally comprise one or more of: a quality-of-service (QoS) requirement for intended data or SL QoS flow; a cause at block 12 for attempting to set-up the communication channel 19 with relay (e.g., radio link failure recovery, for reliability, or for power saving); an indication (implicit or explicit) whether the requested relay must be a 2-hop relay (implicit for preconfigured causes such as radio link failure or dual connectivity (DC) over SL or for reconfigured QoS requirements) or not (optionally indicating a maximum number of hops); and an indication whether the relay is for uni- or bi-directional U-plane data.

In at least some of the preceding examples, the relay response message 17 can additionally comprise one or more of: UE capability of the responding relay UE 110 (R-UE); limitation/preference of the responding relay UE 110 (R-UE) in serving the relay request.

Figure 5:
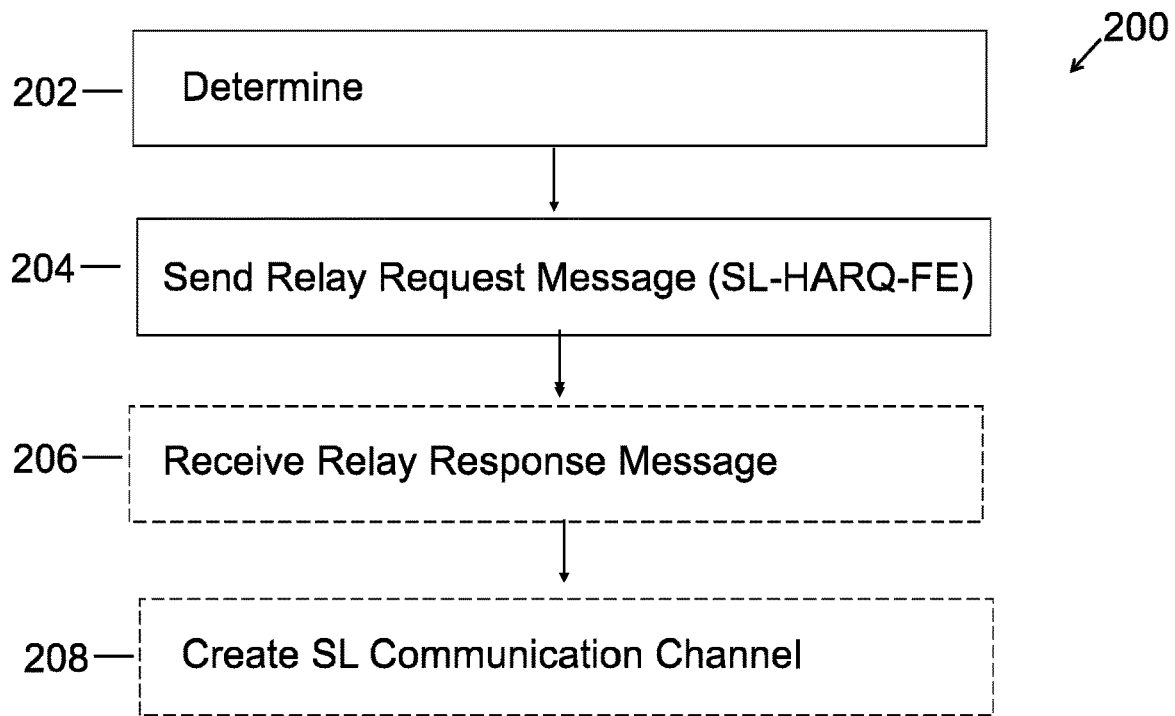
FIG. 5 shows another example of the subject matter described herein.

FIG. 5 illustrates an example of a method 200. This method can, for example, be performed by the source UE 110 (Tx UE) to create a unicast sidelink communication channel 19 between the source UE 110 (Tx UE) and a target UE 110 (Rx UE) via a relay UE 110 (R-UE).

At block 202, the method 200 comprises determining to attempt to create a unicast sidelink communication channel 19 between the source UE 110 (Tx UE) and an identified target UE 110 (Rx UE) via a relay UE 110 (R-UE).

At block 204, the method 200 comprises sending a relay request message 11 to at least one relay user equipment 110 (R-UE). The relay UE 110 is mobile equipment 110 operable as a relay to the target UE 110 (Rx UE). The relay request message 11 comprises at least some information for configuring a sidelink hybrid automatic repeat request (HARQ) process 16 with feedback enabled.

At block 206, the method 200 can comprise receiving a relay response message 17 from the relay UE 110 (R-UE) indicative of communication 13, 15 between the relay UE 110 (R-UE) and the target UE 110 (Rx UE).

At block 206, the method 200 can comprise creating a unicast sidelink communication channel 19 between a user equipment 110 and an identified target UE 110 (Rx UE) via a relay UE 110 (R-UE) based the received relay response message.

Figure 6:
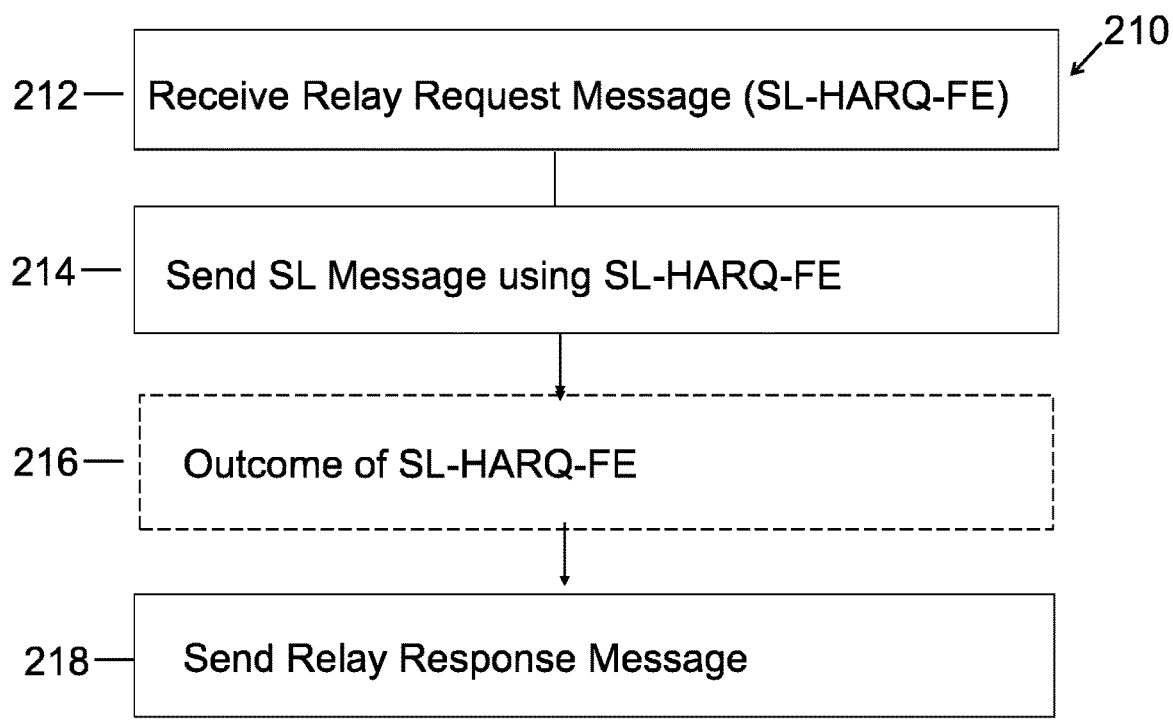
FIG. 6 shows another example of the subject matter described herein.

FIG. 6 illustrates an example of a method 210. This method can, for example, be performed by the relay UE 110 (R-UE) to create a unicast sidelink communication channel 19 between a source UE 110 (Tx UE) and a target UE 110 (Rx UE) via the relay UE 110 (R-UE).

At block 212, the method 210 comprises receiving a relay request message 11 from a source UE 110 (Tx UE). The relay request message 11 comprises at least some information for configuring a sidelink hybrid automatic repeat request (HARQ) process 16 with feedback enabled.

At block 214, the method 210 comprises sending a sidelink message 13 to a target UE 110 (Rx UE) using the sidelink HARQ process 16 with feedback enabled. The sidelink message 13 is configured for the sidelink HARQ process with feedback enabled according to the received information for configuring the sidelink HARQ process 16 with feedback enabled.

At block 216, the method 210 comprises determining an outcome of the sidelink HARQ process between the mobile equipment 110 and the target UE 110 (Rx UE).

At block 218, the method 210 comprises sending a relay response message 17 to the source UE 110 (Tx UE) that is indicative of the determined outcome of the sidelink HARQ process between the mobile equipment 110 and the target UE 110 (Rx UE).

Figure 7:
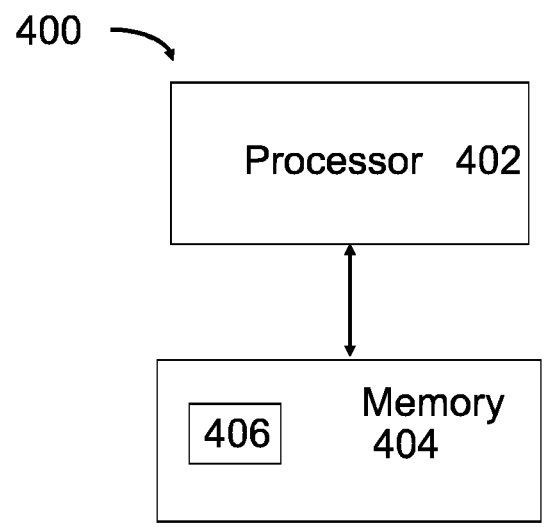
FIG. 7 shows another example of the subject matter described herein.

FIG. 7 illustrates an example of a controller 400 suitable for use in a mobile equipment 110. The controller 400 can be configured to enable the mobile equipment 110 to operate as a source UE (Tx UE) and/or a relay UE (R-UE) and/or a target UE (Rx UE).

Implementation of a controller 400 may be as controller circuitry. The controller 400 may be implemented in hardware alone, have certain aspects in software including firmware alone or can be a combination of hardware and software (including firmware).

As illustrated in FIG. 7 the controller 400 may be implemented using instructions that enable hardware functionality, for example, by using executable instructions of a computer program 406 in a general-purpose or special-purpose processor 402 that may be stored on a computer readable storage medium (disk, memory etc) to be executed by such a processor 402.

The processor 402 is configured to read from and write to the memory 404. The processor 402 may also comprise an output interface via which data and/or commands are output by the processor 402 and an input interface via which data and/or commands are input to the processor 402.

The memory 404 stores a computer program 406 comprising computer program instructions (computer program code) that controls the operation of the apparatus 110 when loaded into the processor 402. The computer program instructions, of the computer program 406, provide the logic and routines that enables the apparatus to perform the methods illustrated in FIGS. 2 to 6. The processor 402 by reading the memory 404 is able to load and execute the computer program 406.

The apparatus 110 can therefore comprise:
at least one processor 402; and
at least one memory 404 including computer program code
the at least one memory 404 and the computer program code configured to, with the at least one processor 402, cause the apparatus 110 at least to perform:
determining to attempt to create a unicast sidelink communication channel between a user equipment and an identified target user equipment via a relay user equipment; and sending a relay request message to at least one mobile equipment, operable as a relay to the target user equipment, wherein the relay request message comprises at least some information for configuring a sidelink process to obtain feedback from the target user equipment.

The apparatus 110 can therefore comprise:
at least one processor 402; and
at least one memory 404 including computer program code
the at least one memory 404 and the computer program code configured to, with the at least one processor 402, cause the apparatus 110 at least to perform:
receiving a relay request message from a source mobile equipment, the relay request message comprising at least some information for configuring a sidelink process to obtain feedback from a target user equipment; and
sending a message to the target user equipment using the configured process, wherein the message is configured for the configured process according to the received information for configuring a sidelink process to obtain feedback from a target user equipment; and
sending a relay response message to the source mobile equipment that is indicative of an outcome of the configured process between the mobile equipment and the target user equipment.

Figure 8:
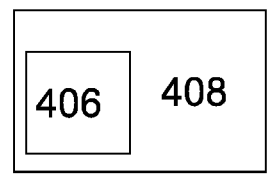
FIG. 8 shows another example of the subject matter described herein.

As illustrated in FIG. 8, the computer program 406 may arrive at the apparatus 110 via any suitable delivery mechanism 408. The delivery mechanism 408 may be, for example, a machine readable medium, a computer-readable medium, a non-transitory computer-readable storage medium, a computer program product, a memory device, a record medium such as a Compact Disc Read-Only Memory (CD-ROM) or a Digital Versatile Disc (DVD) or a solid state memory, an article of manufacture that comprises or tangibly embodies the computer program 406. The delivery mechanism may be a signal configured to reliably transfer the computer program 406. The apparatus 110 may propagate or transmit the computer program 406 as a computer data signal.

The computer program instructions can cause an apparatus 110 to perform at least the following or for performing at least the following:
determining to attempt to create a unicast sidelink communication channel between the user equipment and an identified target user equipment via a relay user equipment; and sending a relay request message to at least one mobile equipment, operable as a relay to the target user equipment, wherein the relay request message comprises at least some information for configuring a sidelink process to obtain feedback from the target user equipment.

The computer program instructions can cause an apparatus 110 to perform at least the following or for performing at least the following:
receiving a relay request message from a source mobile equipment, the relay request message comprising at least some information for configuring a sidelink process to obtain feedback from the target user equipment; and
sending a sidelink message to a target user equipment using the sidelink HARQ process with feedback enabled, wherein the sidelink message is configured for the sidelink HARQ process with feedback enabled according to the received information for configuring the sidelink HARQ process with feedback enabled; and sending a relay response message to the source mobile equipment that is indicative of an outcome of the sidelink HARQ process between the mobile equipment and the target user equipment.

The computer program instructions may be comprised in a computer program, a non-transitory computer readable medium, a computer program product, a machine readable medium. In some but not necessarily all examples, the computer program instructions may be distributed over more than one computer program.

Although the memory 404 is illustrated as a single component/circuitry it may be implemented as one or more separate components/circuitry some or all of which may be integrated/removable and/or may provide permanent/semi-permanent/dynamic/cached storage.

Although the processor 402 is illustrated as a single component/circuitry it may be implemented as one or more separate components/circuitry some or all of which may be integrated/removable. The processor 402 may be a single core or multi-core processor.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

As used in this application, the term 'circuitry' may refer to one or more or all of the following:
(a) hardware-only circuitry implementations (such as implementations in only analog and/or digital circuitry) and
(b) combinations of hardware circuits and software, such as (as applicable):
(i) a combination of analog and/or digital hardware circuit(s) with software/firmware and
(ii) any portions of hardware processor(s) with software (including digital signal processor(s)), software, and memory(ies) that work together to cause an apparatus, such as a mobile phone or server, to perform various functions and
(c) hardware circuit(s) and or processor(s), such as a microprocessor(s) or a portion of a microprocessor(s), that requires software (e.g. firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor and its (or their) accompanying software and/or firmware. The term circuitry also covers, for example and if applicable to the particular claim element, a baseband integrated circuit for a mobile device or a similar integrated circuit in a server, a cellular network device, or other computing or network device.

The blocks illustrated in the FIGS. 2 to 6 may represent steps in a method and/or sections of code in the computer program 406. The illustration of a particular order to the blocks does not necessarily imply that there is a required or preferred order for the blocks and the order and arrangement of the block may be varied. Furthermore, it may be possible for some blocks to be omitted.

Where a structural feature has been described, it may be replaced by means for performing one or more of the functions of the structural feature whether that function or those functions are explicitly or implicitly described.

The above described examples find application as enabling components of:
automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one . . . " or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although examples have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain examples, those features may also be present in other examples whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer any exclusive meaning.

The presence of a feature (or combination of features) in a claim is a reference to that feature or (combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

What is claimed is:

1. A mobile equipment, comprising:
   at least one processor; and
   at least one memory including computer program code, the at least one memory and the computer program code are configured to, with the at least one processor, cause the mobile equipment at least to:
      receive a relay request message from a source user equipment, the relay request message comprising an identifier of the source user equipment, an identifier of the target user equipment, and information for configuring a common sidelink hybrid automatic repeat request (HARQ) process with feedback enabled to obtain feedback from a target user equipment, the HARQ process being configured to include sidelink control information (SCI) for HARQ re-transmissions without an associated transport block (TB)
      determine, based on the received relay request message, whether to participate in probing the target user equipment using the configured common sidelink HARQ process with feedback enabled and allocated sidelink transmission resources indicated in the relay request message;
      in response to determining to participate, send a unicast sidelink message to the target user equipment using the configured common sidelink HARQ process with feedback enabled, wherein the unicast sidelink message includes the SCI without a transport block, wherein the unicast sidelink message includes, as its source identifier, the identifier of the source user equipment, and wherein the unicast sidelink message includes, as its destination identifier, the identifier of the target user equipment, such that the sidelink message appears to the target user equipment as originating from the source user equipment;
      receive a HARQ response message from the target user equipment in response to the transmitted sidelink message, the HARQ response message comprising a negative acknowledgment (NACK) automatically generated by the target user equipment due to absence of a transport block;
      determine, based on a received signal strength measurement associated with the HARQ response message, whether the target user equipment is reachable by the mobile equipment; and
      based on the determination that the target user equipment is reachable, send a unicast relay response message to the source user equipment, the unicast relay response message being indicative of successful HARQ-based probing of the target user equipment, the unicast relay response message comprising: an identifier of the target user equipment used as a spoofed source identifier of the relay response message, an identifier of the source user equipment as the destination identifier of the relay response message, and an information element identifying the mobile equipment as an actual sender of the unicast relay response message.

2. The mobile equipment as claimed in claim 1, wherein the at least one memory and the computer program code are further configured to, with the at least one processor, cause the mobile equipment to:
   in response to receiving the NACK, send the unicast relay response message to the source user equipment.

3. A method performed by a user equipment operable as a relay user equipment in a network, the method comprising:
   receiving a relay request message from a source user equipment, the relay request message comprising an identifier of the source user equipment, an identifier of the target user equipment, and information for configuring a common sidelink hybrid automatic repeat request (HARQ) process with feedback enabled to obtain feedback from a target user equipment, the HARQ process being configured to include sidelink control information (SCI) for HARQ re-transmissions without an associated transport block (TB);
   determining, based on the received relay request message, whether to participate in probing the target user equipment using the configured common sidelink HARQ process with feedback enabled and allocated sidelink transmission resources indicated in the relay request message;
   in response to determining to participate, sending a unicast sidelink message to the target user equipment using the configured common sidelink HARQ process with feedback enabled, wherein the unicast sidelink message includes the SCI without a transport block, wherein the unicast sidelink message includes, as its source identifier, the identifier of the source user equipment, and wherein the unicast sidelink message includes, as its destination identifier, the identifier of the target user equipment, such that the sidelink message appears to the target user equipment as originating from the source user equipment;
   receiving a HARQ response message from the target user equipment in response to the transmitted sidelink message, the HARQ response message comprising a negative acknowledgment (NACK) automatically generated by the target user equipment due to absence of a transport block;

determining, based on a received signal strength measurement associated with the HARQ response message, whether the target user equipment is reachable by the mobile equipment; and based on the determination that the target user equipment is reachable, sending a unicast relay response message to the source user equipment, the unicast relay response message being indicative of successful HARQ-based probing of the target user equipment, the unicast relay response message comprising: an identifier of the target user equipment used as a spoofed source identifier of the relay response message, an identifier of the source user equipment as the destination identifier of the relay response message, and an information element identifying the mobile equipment as an actual sender of the unicast relay response message.

* * * * *